US 8,400,986 B2

(12) United States Patent
Ozluturk

(10) Patent No.: US 8,400,986 B2
(45) Date of Patent: Mar. 19, 2013

(54) RANDOM ACCESS CHANNEL FOR OFDM-MIMO SYSTEM

(75) Inventor: Fatih M. Ozluturk, Port Washington, NY (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

(21) Appl. No.: 13/224,463

(22) Filed: Sep. 2, 2011

(65) Prior Publication Data

US 2011/0310940 A1 Dec. 22, 2011

Related U.S. Application Data

(63) Continuation of application No. 11/746,363, filed on May 9, 2007, now Pat. No. 8,014,361.

(60) Provisional application No. 60/798,970, filed on May 9, 2006.

(51) Int. Cl.
*H04B 7/216* (2006.01)

(52) U.S. Cl. .......... 370/335; 370/64; 370/480; 370/344; 370/235; 370/436; 455/411; 455/410; 455/435.1; 455/414.1

(58) Field of Classification Search .............. 370/64, 370/480, 335, 344, 235, 436; 455/411, 410, 455/435.1, 414.1
See application file for complete search history.

(56) References Cited

U.S. PATENT DOCUMENTS

| | | | |
|---|---|---|---|
| 7,539,263 B2 | 5/2009 | Jung et al. | |
| 2003/0076812 A1* | 4/2003 | Benedittis | 370/350 |
| 2004/0001429 A1* | 1/2004 | Ma et al. | 370/210 |
| 2004/0081131 A1 | 4/2004 | Walton et al. | |
| 2005/0002325 A1 | 1/2005 | Giannakis et al. | |
| 2005/0084030 A1 | 4/2005 | Zhou et al. | |
| 2005/0226140 A1 | 10/2005 | Zhuang et al. | |
| 2005/0286465 A1 | 12/2005 | Zhuang | |
| 2006/0009227 A1 | 1/2006 | Cudak et al. | |
| 2006/0056528 A1* | 3/2006 | Jung et al. | 375/260 |
| 2006/0073834 A1 | 4/2006 | Thorson | |
| 2007/0165567 A1* | 7/2007 | Tan et al. | 370/329 |

(Continued)

FOREIGN PATENT DOCUMENTS

| | | |
|---|---|---|
| JP | 2004-297186 | 10/2004 |
| WO | 00/22873 | 4/2000 |

(Continued)

OTHER PUBLICATIONS

3GPP, "3rd Generation Partnership Project; Technical Specification Group Radio Access Network; Physical Layer Aspects for Evolved UTRA (Release 7)", 3GPP TR25.814 V0.1.1 (Jun. 2005).

(Continued)

*Primary Examiner* — Kwasi Karikari
(74) *Attorney, Agent, or Firm* — Volpe and Koenig, P.C.

(57) ABSTRACT

In orthogonal frequency division multiplexing (OFDM) multiple-input multiple-output (MIMO) systems, a wireless transmit/receive unit (WTRU) selects a random access channel (RACH) and a phase for a constant amplitude zero auto correlation (CAZAC) sequence for RACH transmission. The WTRU then transmits a RACH transmission to a Node B via the selected RACH. Once the RACH transmission is detected, the Node B sends an acknowledgement (ACK) to the WTRU over an ACK channel. The Node B may transmit the ACK on a shared channel. The WTRU may ramp up transmit power while the RACH transmission is transmitted, or steps up transmit power of a subsequent RACH transmission. The RACH transmission and data transmission may be either time multiplexed or frequency multiplexed. A plurality of RACHs may be defined and one of the defined RACHs may be selected randomly or based on predetermined criteria.

12 Claims, 7 Drawing Sheets

U.S. PATENT DOCUMENTS

| | | | |
|---|---|---|---|
| 2007/0165857 | A1 | 7/2007 | Das et al. |
| 2007/0183371 | A1 | 8/2007 | McCoy |
| 2008/0123616 | A1* | 5/2008 | Lee .............................. 370/344 |
| 2010/0002671 | A1 | 1/2010 | Iwai et al. |

FOREIGN PATENT DOCUMENTS

| | | |
|---|---|---|
| WO | 2005/055527 | 6/2005 |

OTHER PUBLICATIONS

Motorola, "Preamble Sequence Design for Random Access of E-UTRA", 3GPP TSG RAN1#45, R1-061168, (Shanghai, China May 2006).
"Table Summary Random Access Proposal," 3GPP TSG RAN1#44-bis, R1-060886 (Mar. 2006).
3GPP, "3rd Generation Partnership Project; Technical Specification Group Radio Access Network; Physical Layer Aspects for Evolved UTRA (Release 7)", 3GPP TR25.814 V0.1.1, (Jun. 2005).
3GPP, "3rd Generation Partnership Project; Technical Specification Group Radio Access Network; Multiplexing and channel coding (Release 8)," 3GPP TS 36.212 V1.0.0 (Mar. 2007).
3GPP, "3rd Generation Partnership Project; Technical Specification Group Radio Access Network; Physical Channels and Modulation (Release 8)," 3GPP TS 36.211 V1.0.0 (Mar. 2007).
3GPP, "3rd Generation Partnership Project; Technical Specification Group Radio Access Network; Physical layer procedures (Release 8)," 3GPP TS 36.213 V1.0.0 (Mar. 2007).
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.0.0 (Mar. 2007).
3GPP, "3rd Generation Partnership Project; Technical Specification Group Radio Access Network; Physical Layer Aspects for Evolved UTRA (Release 7)," 3GPP TR 25.814 V1.2.2 (Mar. 2006).
Branislav M. Popović, "Generalized Chirp-Like Polyphase Sequences With Optimal Correlation Properties", IEEE Transactions on Information Theory, vol. 38, No. 4, pp. 1406-1409, (Jul. 1992).
Catt et al., "EUTRA TDD Random Access Procedure," 3GPP TSG RAN WG1 Meeting #44, R1-060520 (Feb. 13-17, 2006).
CCL/ITRI, "Random Access Transmission with Priority in E-UTRA uplink," 3GPP TSG RAN WG1 Meeting #44, R1-060512 (Feb. 13-17, 2006).
Ericsson, "E-UTRA Random Access," TSG-RAN WG1 #44, R1-060584 (Feb. 13-17, 2006).
Fan et al., "Generalized Orthogonal Sequences and Their Applications in Synchronous CDMA Systems", IEICE Trans. Fundamentals, vol. E83-A, No. 11, pp. 2054-2069, (Nov. 2000).
Huawei, "RACH Design for E-UTRA", 3GPP TSG RAN WG1 Meeting #44bis, R1-060797, (Athens, Greece Mar. 2006).
Huawei, "RACH design for E-UTRA," 3GPP TSG RAN WG1 Meeting #44, R1-060328 (Feb. 13-17, 2006).
Huawei, "Some Considerations for Random Access Frame Design," 3GPP TSG RAN WG1 Meeting #44, R1060541 (Feb. 13-17, 2006).
IEEE Standard for Local and metropolitan area networks; Part 16: Air Interface for Fixed Broadband Wireless Access Systems, IEEE Std 802.16-2004 (Revision of IEEE Std 802.16-2001) (Oct. 1, 2004).
IPWireless, "Initial Access Procedure and Uplink Synchronisation," 3GPP TSG RAN WG1 #44, R1-060637 (Feb. 13-17, 2006).
Kanemaru et al., "Space-Time/Space-Frequency Block Coded OFDM with Diagonalized Maximum Likelihood Decoder (ST/SF-OFDM with DMLD)," Technical Report of IEICE, vol. 103, No. 66, pp. 69-74 (May 16, 2003).

LG Electronics, "Some considerations for LTE RACH," 3GPP TSG RAN WG1 Meeting #44, R1-060531 (Feb. 13-17, 2006).
Masson, "E-UTRA RACH within the LTE System," XR-EE-KT 2006:002 (Feb. 3, 2006).
Motorola, "Preamble Sequence Design for Random Access of E-UTRA", 3GPP TSG RAN1#45, R1061168, (Shanghai, China May 2006).
Motorola, "Random Access Sequence Design", 3GPP TSG RAN1#44-bis, R1-060884, (Athens, Greece Mar. 2006).
Motorola, "EUTRA Uplink Numerology and Design," 3GPP RAN1#41bis, R1-050584 (Jun. 20-21, 2005).
Motorola, "RACH Design for EUTRA," 3GPP TSG RAN 1 #44, R1-060387 (Feb. 13-16, 2006).
Nokia, "Random access message—text proposal," 3GPP TSG RAN WG1 Meeting #44, R1-060296 (Feb. 13-17, 2006).
Nortel Networks, "Consideration on Issues of LTE RACH", 3GPP RAN1 Meeting #44-bis, R1-060909, (Athens, Greece Mar. 2006).
Nortel Networks, "Consideration on UL RACH scheme for LTE," 3GPP RAN1 meeting #44, R1-060653 (Feb. 13-17, 2006).
Nortel Networks, "On the performances of LTE RACH," 3GPP RAN1 meeting #44-bis, R1-060908 (Mar. 27-31, 2006).
Nortel, "Text proposal on random access procedure and scheduling," TSG-RAN WG1 meeting #44, R1060655 (Feb. 13-17, 2006).
Nortel, "Text proposal on random access scheme," TSG-RAN WG1 meeting #44, R1-060654 (Feb. 13-17, 2006).
NTT DoCoMo et al., "Random Access Channel Structure for E-UTRA Uplink," 3GPP TSG-RAN WG1 Meeting #44, R1-060322 (Feb. 13-17, 2006).
Panasonic, "Random Access Designs for E-UTRA Uplink", TSG-RAN WG1 Meeting#45, R1-061114, (Shanghai, China May 2006).
Philips, "Random Access and UL Sync considerations and discussion of L1 questions from RAN2," 3GPP TSG RAN WG1 meeting #44, R1-060560 (Feb. 13-17, 2006).
QUALCOMM Europe, "Draft LS Reply for RACH Related Questions," 3GPP TSG-RAN WG1 LTE, R1060481 (Feb. 13-17, 2006).
QUALCOMM Europe, "Principles of RACH," 3GPP TSG-RAN WG1 LTE, R1-060480 (Feb. 13-17, 2006).
Samsung, "Physical Random Access Procedure," 3GPP RAN WG1 #44, R1-060351 (Feb. 13-17, 2006).
Samsung, "Text Proposal on Physical Random Access Procedure," 3GPP RAN WG1 #44, R1-060352 (Feb. 13-17, 2006).
Texas Instruments, "A new preamble shape for the Random Access preamble in E-UTRA," 3GPP TSG RAN WG1 #44-bis, R1-060867 (Mar. 27-31, 2006).
Texas Instruments, "RACH preamble design for E-UTRA," 3GPP TSG RAN WG1 #44, R1-060376 (Feb. 13-17, 2006).
Texas Instruments, "RACH Preamble Design," 3GPP TSG RAN WG1 Meeting #42bis, R1-051058 (Oct. 10-14, 2005).
Texas Instruments, "RACH Preamble Design," 3GPP TSG RAN WG1 Meeting #42bis, R1-051058 (Oct. 10-14, 2005) (Powerpoint version).
Wen et al., "CAZAC sequence and its application in LTE random access," Proceedings of 2006 Information Theory Workshop, pp. 544-547 (Oct. 2006).
IEEE Standard for Local and metropolitan area networks; Part 16: Air Interface for Fixed Broadband Wireless Access Systems, IEEE Std 802.16/2004 (Revision of IEEE Std 802.16-2001) (Oct. 1, 2004).
Nortel Networks, " On the performances of LTE RACH," 3GPP RAN1 meeting #44-bis, R1-060908 (Mar. 27-31, 2006).

* cited by examiner

RANDOM ACCESS CHANNEL FOR OFDM-MIMO SYSTEM

CROSS REFERENCE TO RELATED APPLICATION

This application is a continuation of U.S. patent application Ser. No. 11/746,363, filed May 9, 2007, which claims the benefit of U.S. Provisional Application No. 60/798,970 filed May 9, 2006, which are incorporated by reference as if fully set forth.

FIELD OF INVENTION

The present invention relates to wireless communications. More particularly, the present invention relates to a random access channel (RACH) in orthogonal frequency division multiplexing (OFDM) multiple-input multiple-output (MIMO) systems.

BACKGROUND

In a wireless communication system, a RACH is used by a user terminal to establish a link with a base station for data transmission. The access via the RACH should not create undue interference on other communication links in a cell and should allow differentiation for a large group of users. The channel that the user terminal uses to establish the initial link with the base station is an RACH. The design of an RACH should meet such requirements as allowing the base station to detect access attempts easily, allow enough capacity for a large number of terminals to access the base station without undue congestion, and allow differentiation for groups of users since it is desirable for the base station to differentiate access attempts.

SUMMARY

The present invention relates to an RACH in OFDM MIMO systems. A wireless transmit/receive unit (WTRU) selects an RACH and a phase for a constant amplitude zero auto correlation (CAZAC) sequence for RACH transmission. The WTRU then transmits a RACH transmission to a Node B via the selected RACH. Once the RACH transmission is detected, the Node B sends an acknowledgement (ACK) to the WTRU over an ACK channel. The Node B may transmit the ACK on a shared channel. The WTRU may ramp up transmit power while the RACH transmission is transmitted, or steps up transmit power of a subsequent RACH transmission. The RACH transmission and data transmission may be either time multiplexed or frequency multiplexed. A plurality of RACHs may be defined and one of the defined RACHs may be selected randomly or based on predetermined criteria. The RACH transmission may be transmitted using one of space-frequency block coding (SFBC), space time block coding (STBC), and beam forming.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment.

Figure 1:
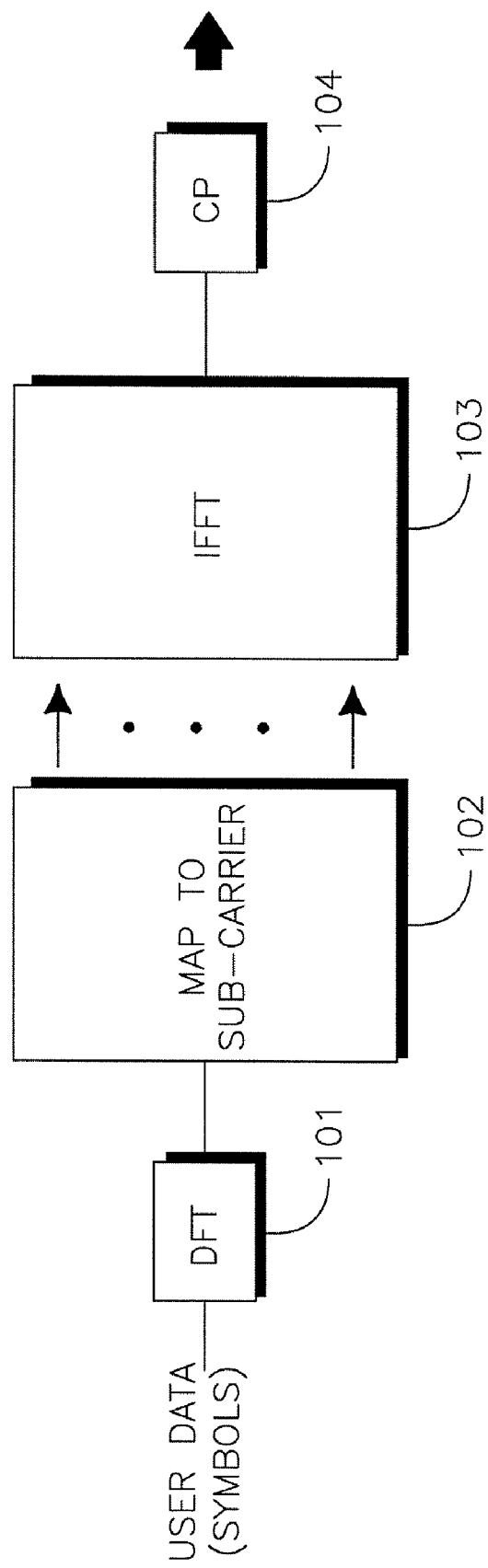
FIG. 1 shows a schematic flow of uplink data transmission in an OFDM system.

FIG. 1 shows a schematic flow of uplink data transmission in an OFDM system. A discrete Fourier transform (DFT), (equivalently, fast Fourier transform (FFT)), is performed on user data symbols to be transmitted by a DFT unit 101, (or FFT unit). The resulting data after DFT processing is mapped to a group of sub-carriers by a mapping unit 102. The sub-carrier mapping may be either localized sub-carrier mapping or a distributed sub-carrier mapping. Next, an inverse fast Fourier transform (IFFT), (equivalently inverse DFT), is performed by an IFFT unit 103 (or inverse DFT unit) on the sub-carrier mapped data. A cyclic prefix (CP) is then attached by a CP unit 104 before transmission of the sub-carrier mapped data.

Figure 7:
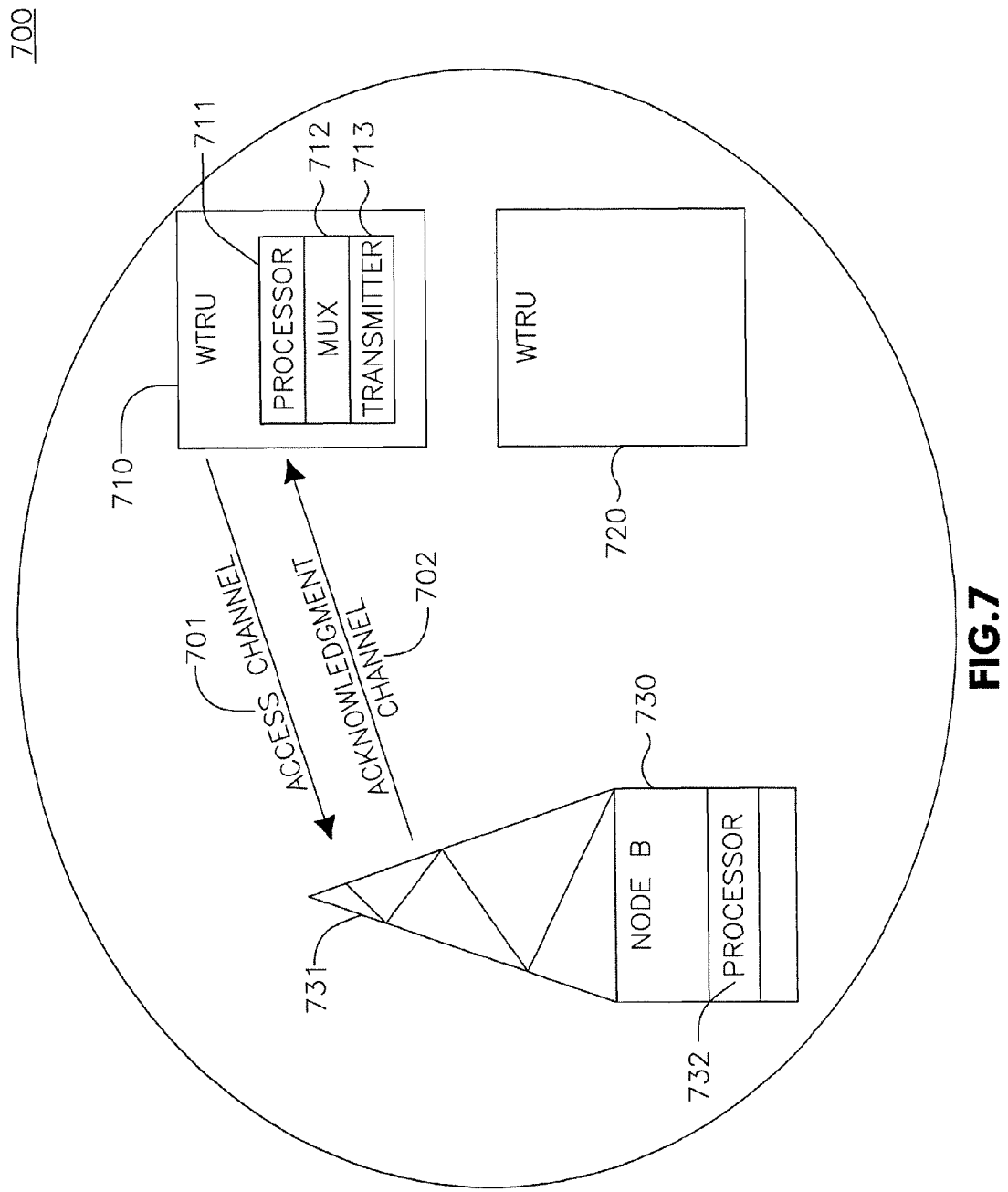
FIG. 7 shows a wireless communication system in accordance with the present invention.

FIG. 7 shows a wireless communication system 700 in accordance with the present invention. The system 700 comprises a Node B 730 in communication with at least one WTRU 710, 720 in a cell. A WTRU 710, 720 includes a processor 711, a multiplexer (MUX) 712, and a transmitter 713. FIG. 7 shows components of the WTRU 710 separately, but some components may be implemented by more or less components. The WTRU 710 sends an RACH transmission to the Node B 730 over an access channel 701, (i.e., an RACH), for an initial access. After detecting the RACH transmission from the WTRU 710, the Node B 730 returns an ACK over an ACK channel 702.

It may take several RACH transmissions before the Node B 730 detects the RACH transmission from the WTRU 710. The WTRU initially sets a transmit power level of the RACH transmission to a predetermined level and increases the transmit power level for the subsequent RACH transmissions. Alternatively, the WTRU may ramp up the transmit power level of the RACH transmission while transmitting the RACH transmission, which will be explained in detail hereinafter.

Figure 2:
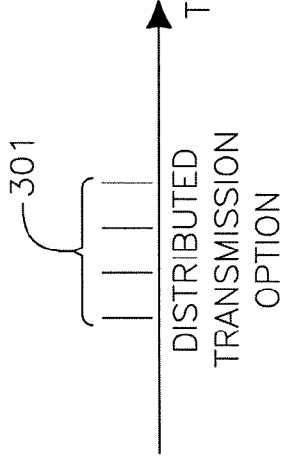
FIG. 2 shows sub-carrier mapping for an RACH in a localized transmission option.
Figure 3:
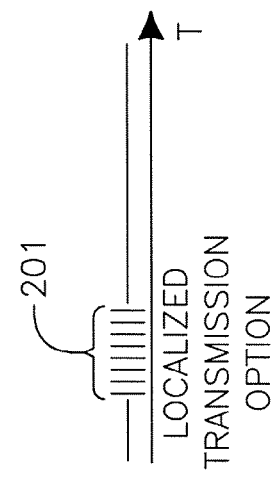
FIG. 3 shows sub-carrier mapping for an RACH in a distributed transmission option.

A set of subcarriers is assigned for an RACH. Subcarriers assigned for the RACH may be either "localized" or "distributed" in a frequency band. FIG. 2 shows a localized mapping where a block of consecutive subcarriers 201 are assigned for an RACH. FIG. 3 shows a distributed mapping where a plurality of distributed subcarriers 301 across the frequency band are assigned for an RACH.

The random access procedure includes sending a signature sequence and performing time and or frequency multiplexing RACH and data transmissions. A plurality of orthogonal signature sequences are defined and the WTRU 710 sends one of the signature sequences via an RACH.

The RACH transmissions include a transmit power ramp up in transmission of the signature sequence. As explained hereinbefore, since there is no code to detect, the ramp up can be faster. In a conventional OFDM system, no code search is performed. However, in accordance with the present invention, the RACH is searchable over subcarriers for the presence of a pattern.

Figure 4:
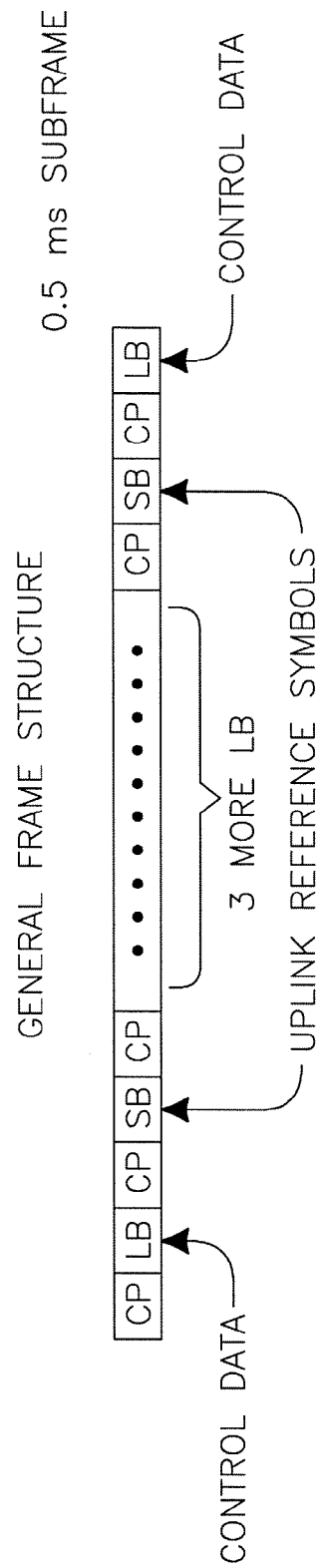
FIG. 4 shows a frame structure of a RACH in accordance with the present invention.

FIG. 4 shows an OFDM subframe structure for the RACH in accordance with the present invention. A 0.5 ms OFDM subframe includes a plurality of short blocks (SBs) and a plurality of long blocks (LBs). Each of the SBs and LBs are separated by a CP. The RACH includes control data included in a LB and/or uplink reference symbols included in an SB. The uplink reference symbols include both channel estimation and channel quality indication (CQI) measurements. The uplink reference symbols are orthogonal each other and are either: (1) multiplexed auto (different sets of sub-carriers); (2) time multiplexed; (3) code multiplexed (different shifts of a constant amplitude zero auto correlation (CAZAC) sequence).

Figure 5:
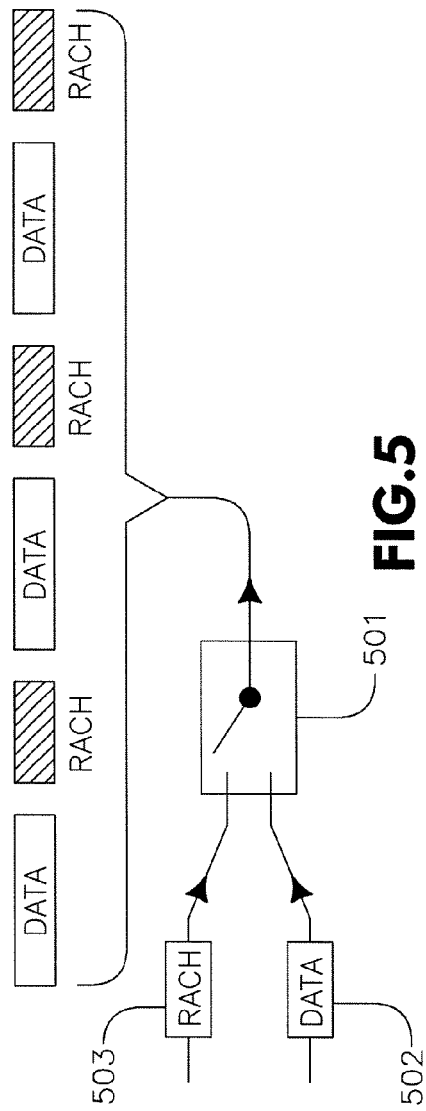
FIG. 5 shows multiple data frames with slots for RACH transmission in-between them.

In accordance with one embodiment of the present invention, RACH transmissions and data transmissions are time multiplexed. All terminals that are communicating have been time synchronized to the Node B. In a variation of the first embodiment, there is a slot for RACH transmission to happen between data frames, or multiple data frames as shown in FIG. 5. The multiplexing is accomplished either in software operating on a general purpose processor, or using dedicated logic circuit to perform the multiplexing. A dedicated logic circuit would simply include a switch 501 that switches between a data stream 502 and RACH information 503, taking a fixed number of bits/symbols from each one in order. An RACH access may occur during the random access slots. Alternatively, the RACH access may occur every few data frames.

Figure 6:
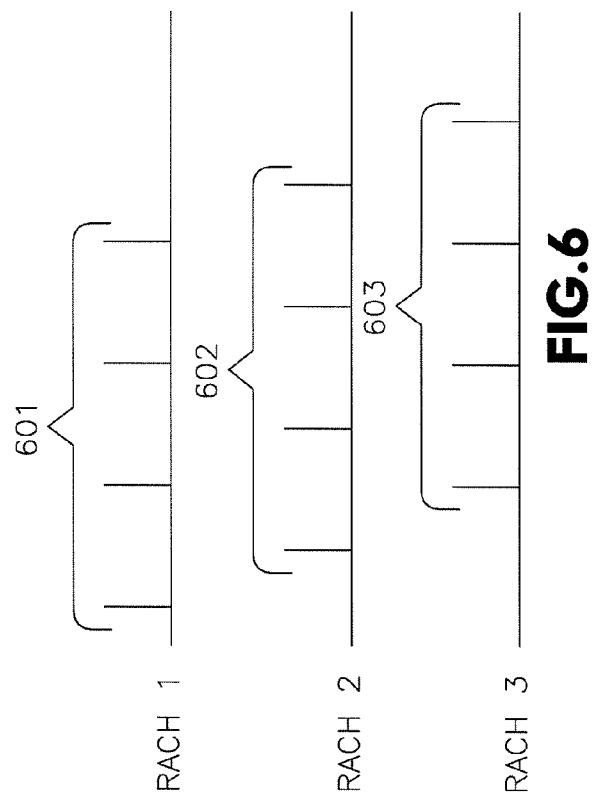
FIG. 6 shows multiple RACHs that are defined by different sets of sub-carriers.

Multiple RACHs may be defined as different sets of subcarriers. FIG. 6 shows three (3) RACHs, (RACH1, RACH2, and RACH3), as an example, each with a unique set of subcarriers. For RACH transmission, one of the defined RACHs may be chosen by a WTRU randomly, or may be assigned to a WTRU based on predetermined criteria. One way to assign a different RACH to a different user is using a serial number of a WTRU. Alternatively, any other criterion, (such as user ID), that is unique to each user may be used for the RACH assignment. As an example, if the slots are assigned based on the last digit of a user specific number, and if the numbers are random to begin with, users may be grouped into ten groups (one group for each slot 0, 1, 2, . . . , 9).

On a downlink ACK channel, which is used to let a user know that a WTRU is recognized by a Node B after the WTRU makes an RACH transmission, the Node B may use a set of sub-carriers (i.e., a subchannel) associated with the RACH channel carrier assignments. This enables a user trying to access the Node B to see an ACK message intended for that user.

Additionally, each WTRU may select a random phase of a Constant Amplitude Zero Auto Correlation (CAZAC) sequence to further randomize and avoid collisions between accessing users. In such case, the total number of RACHs is increased by the following formula:

$$\text{Total Number of RACH} = N_{subchannels} \times N_{CAZAC-Random\ phases}.$$

Figure 8:
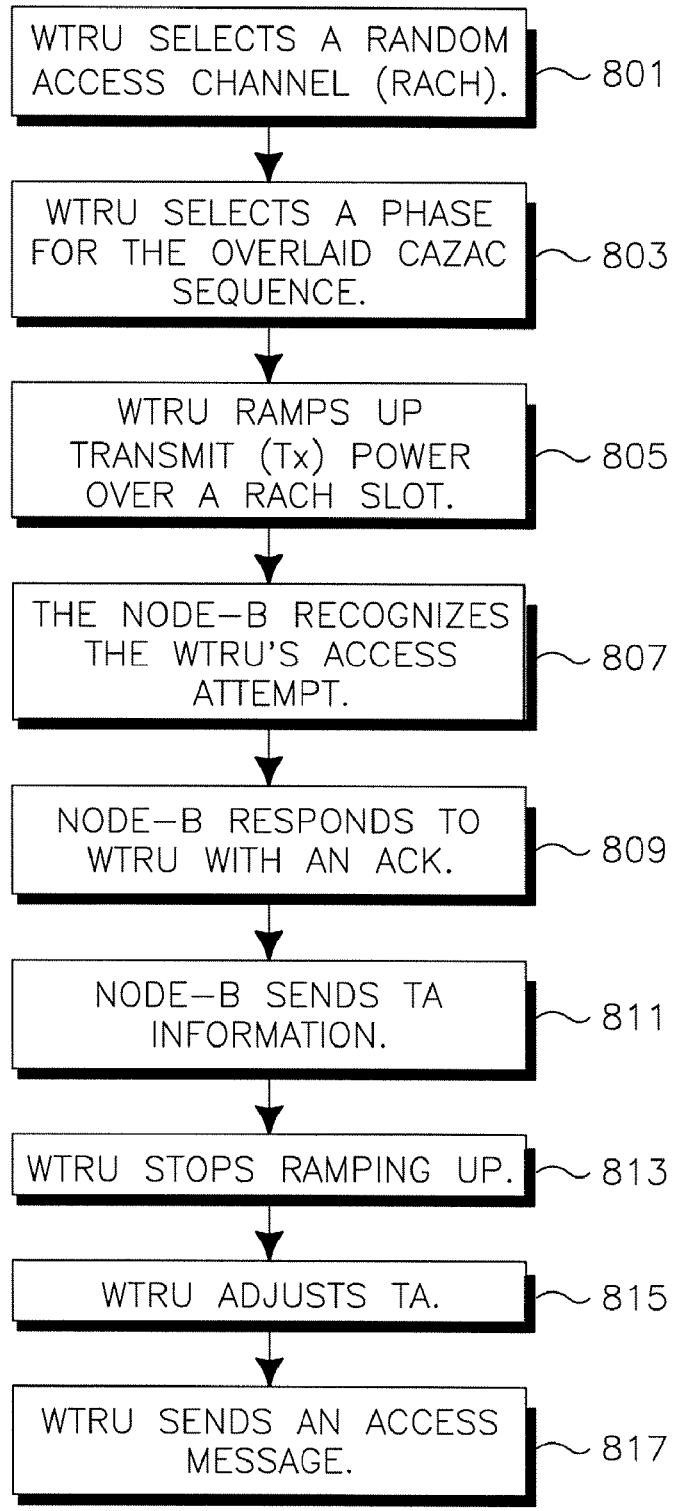
FIG. 8 is a flow diagram of a process of an access via an RACH in accordance with the present invention.
Figure 9:
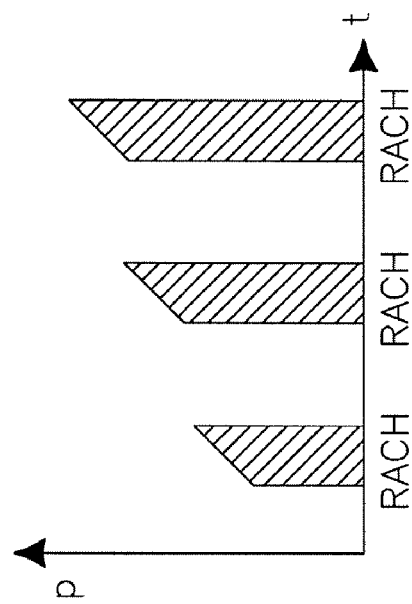
FIG. 9 shows a transmit power ramp up where the transmit power is increased in-between each RACH slot.
Figure 10:
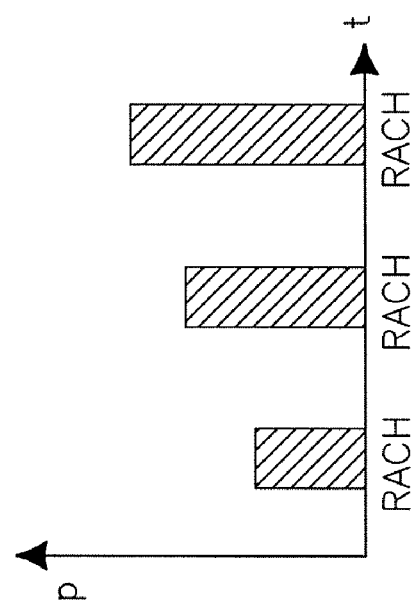
FIG. 10 shows a transmit power ramp up where the transmit power is increased during each RACH.

FIG. 8 is a flow diagram of a process of an access via an RACH in accordance with the present invention. A WTRU 710 selects an RACH among a plurality of pre-defined RACHs (step 801). The WTRU 710 preferably selects a phase for the overlaid CAZAC sequence (step 803). The WTRU 710 sets up a transmit (Tx) power for the RACH while making an RACH transmission (step 805). The RACH transmit power may be ramped up while the RACH transmission is being transmitted as shown in FIG. 9. Alternatively, the transmit power may be stepped up each subsequent RACH transmission as shown in FIG. 10. A Node B processor 732 recognizes the WTRU's attempt on the RACH (step 807). The Node B responds on an associated ACK channel (step 809). The Node B 730 also sends timing advance (TA) information to the WTRU (step 811). The WTRU 710 stops increasing the RACH transmit power once the WTRU 710 receives an ACK from the Node-B 730 (step 813). The WTRU 710 then adjusts TA (step 815) and sends an RACH message (step 817).

A Node B has to implement a detector that will search all RACHs during RACH intervals for WTRUs. The RACH slot must be larger than the trip delay from the Node B, and the slot must also have a CP at the end so as not to interfere with data frames. Associated ACK channels have to be paired with the RACH and CAZAC phase detected. Additional information may be coded on the phase of the RACH access.

Figure 11:
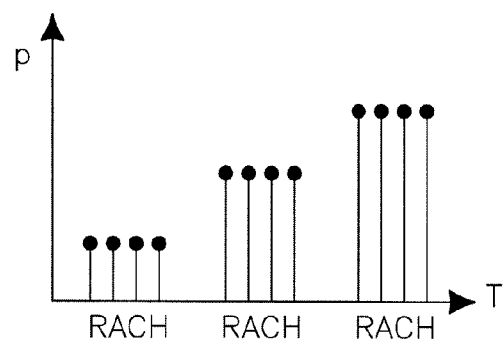
FIG. 11 shows a transmit power ramp up in a distributed channel.

FIG. 11 shows a signal response for the distributed transmission option which is essentially the same as the localized option. In the localized transmission, all subcarriers in the subcarrier block for the RACH are transmitted and the power of all of them is ramped up, or stepped up. In the distributed option shown in FIG. 11, the distributed subcarriers are transmitted and the power of those distributed subcarriers is ramped up, or stepped up. If the first RACH transmission is not successfully received by a Node B, the WTRU sends more than one RACH transmissions while increasing transmit power on the RACH as shown in FIGS. 9-11. Where the RACH access takes more than one RACH slot, the transmit power on the subsequent RACH slot may be the transmit power at the last RACH transmission, or it can be lower or higher than the previous one. The power ramp-up may initially start at a level that is low enough not to cause interference with other cells.

Figure 12:
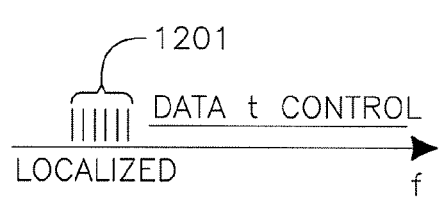
FIG. 12 shows an RACH for a localized mode of frequency multiplexing.
Figure 13:
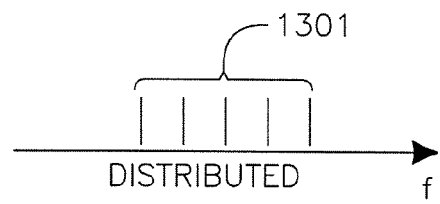
FIG. 13 shows an RACH for a distributed mode of frequency multiplexing.

In accordance with another embodiment of the present invention, some of the subcarriers are used for the RACH while others are used for data and/or control data (i.e., frequency multiplexing). The RACH subcarriers may be localized or distributed as shown in FIGS. 12 and 13. Since all WTRUs are synchronized to a Node B, the WTRUs know the timing and have carrier synchronization. The RACH frame may be a special frame and simply use the same frame structure as the data and control fields.

In this embodiment, power ramp-up operates essentially the same as the time multiplexed embodiment described hereinbefore. A WTRU synchronizes to the Node B and starts ramping up on the access channel. The RACH can have multiple channels with different subcarrier assignments or CAZAC sequences can form multiple RACH channels. Different phases of the CAZAC sequence can be used to increase the number of RACHs.

The Node-B detects the phase of the RACH sequence and the phase can be used to increase the number of RACHs. In other words, since the Node B is capable of detecting different phases of the CAZAC sequence, and CAZAC sequences with different phases are orthogonal to each other (therefore do not interfere with each other), multiple RACH attempts can be made by multiple WTRUs at the same time. This in effect increases the number of available RACHs.

It is important to note that both the time and frequency multiplexed embodiments described above can allow the Node B to transmit an ACK on a shared channel with an indication of the recognized RACH attempt, which is readable by all WTRUs.

There are several considerations that are specific to the MIMO application. Multiple MIMO options are possible including spatial multiplexing, space-frequency block coding (SFBC), space time block coding (STBC), beam forming, and other combinations of these options. When making an attempt to access a Node B, the WTRU should be detected quickly so that the WTRU does not ramp-up too high and cause interference to other WTRUs on the system. Therefore, the WTRU makes the RACH attempt using the MIMO scheme with the highest redundancy among the ones possible. Here, the MIMO scheme with the highest redundancy refers to the MIMO scheme that includes the highest level of diversity gain and therefore is most robust to different channel conditions. Diversity MIMO techniques, (such as STBC or SFBC), take advantage of the diversity gain and enable signaling that is resistant to fading and other channel impairments.

Different MIMO options that may be considered in accordance with the present invention are as follows:

The first option is called a basic STBC option, in which the WTRU makes an RACH access attempt using an open loop STBC. Using an open loop STBC has an advantage that the signal benefits from diversity gain without requiring expensive receivers at the Node B.

The second option is called a dominant mode option, in which the WTRU has downlink channel estimation and may formulate the eigen modes of the channels. The WTRU determines the best mode of the channel by analyzing the signal from the Node B and use the same mode to transmit back. This has an advantage that an effective best beam forming solution is implemented that would increase signal quality at the Node B and make detection performance higher.

Another option is an optimum precoding option. When precoding beam forming is available, the WTRU may select the best precoding option to make an RACH attempt. If a codebook approach is used, the WTRU chooses the precoder that is either most robust for maximum diversity, or has the highest gain. Optimum precoding option is similar to the dominant mode option in that the WTRU applies a precoding matrix to the transmit signal where the precoding matrix is selected from a codebook, and such that the precoding matrix is best suited for the prevailing channel conditions.

After a successful RACH attempt, adaptive modulation coding (AMC) and link adaptation may start. Which option is implemented depends on the channel conditions, the cell type (i.e. hotspot, macro cell, micro cell, etc), and the capabilities of the WTRU.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A Node B configured to provide access to a wireless communications system, the Node B comprising:
a processing device and associate transmitting device configured to transmit random access channel (RACH) assignment information indicating subchannels to be used to transmit a combines phase of a constant amplitude zero autocorrelation (CAZAC) sequence and a cyclic prefix to a wireless transmit/receive unit (WTRU);
a processing device and an associated receiving device configured to receive the combined phase of the CAZAC sequence and the cyclic prefix over a RACH from the WTRU;
the processinf device and an associated transmitting device are further configured to transmit an indication over a shared channel that the phase of the CAZAC sequence was received to the the WTRU, wherein the indication includes a timing advance (TA); and
the processing device and the associated receiving device are further configured to receive a signal including access message data and reference symbols with a transmission timing based on the TA from the WTRU; wherein the reference symbols are derived from the CAZAC sequence.

2. The Node B of claim 1 wherein the received combined phase of the CAZAC sequence and the cyclic prefix is received over a plurality of sub-carriers.

3. The Node B of claim 1 wherein the wireless communication system uses orthogonal frequency division multiplexing (OFDM).

4. The Node B of claim 1 wherein the wireless communication system uses orthogonal frequency division multiplexing (OFDM) multiple input multiple output (MIMO).

5. The Node B of claim 1 wherein the combined phase of the CAZAC sequence and the cyclic prefix is received in a slot.

6. The Node B of claim 1 wherein the received combined phase of the CAZAC sequence and the cyclic prefix is frequency multiplexed with data or control signals from other WTRUs.

7. A method for providing access to a wireless communications system comprising, the method comprising:
  transmitting random access channel (RACH) assignment information indicating subchannels to be used to transmit a combined phase of a constant amplitude zero auto-correlation (CAZAC) sequence and a cyclic prefix to a wireless transmit/receive unit (WTRU);
  receiving a combined phase of the CAZAC sequence and the cyclic prefix over the RACH from the WTRU;
  transmitting an indication over a shared channel that the phase of the CAZAC sequence was received to the WTRU, wherein the indication includes a timing advance (TA); and
  receiving a signal including access message data and reference symbols with a transmission timing based on the TA from the WTRU; wherein the reference symbols are derived from a CAZAC sequence.

8. The method of claim 7 wherein the received combined phase of the CAZAC sequence and the cyclic prefix is received over a plurality of sub-carriers.

9. The method of claim 7 wherein the wireless communication system uses orthogonal frequency division multiplexing (OFDM).

10. The method of claim 7 wherein the wireless communication system uses orthogonal frequency division multiplexing (OFDM) multiple input multiple output (MIMO).

11. The method of claim 7 wherein the combined phase of the CAZAC sequence and the cyclic prefix is received in a slot.

12. The method of claim 7 wherein the received combined phase of the CAZAC sequence and the cyclic prefix is frequency multiplexed with data or control signals from other WTRUs.

* * * * *

UNITED STATES PATENT AND TRADEMARK OFFICE
CERTIFICATE OF CORRECTION

PATENT NO. : 8,400,986 B2  
APPLICATION NO. : 13/224463  
DATED : March 19, 2013  
INVENTOR(S) : Fatih M. Ozluturk Page 1 of 1

It is certified that error appears in the above-identified patent and that said Letters Patent is hereby corrected as shown below:

ON THE TITLE PAGE

At item (57) ABSTRACT, line 6, after "transmits" delete "a" and insert therefore --an--.

At item (57) ABSTRACT, line 11, after "or" delete "steps" and insert therefore --step--.

At item (56) OTHER PUBLICATIONS, page 2, column 2, line 6, after "3GPP TSG RAN1#45," delete "R1061168" and insert therefore --R1-061168--.

At item (56) OTHER PUBLICATIONS, page 2, column 2, line 23, after "#44," delete "R1060655" and insert therefore --R1-060655--.

At item (56) OTHER PUBLICATIONS, page 2, column 2, line 35, after "LTE," delete "R1060481" and insert therefore --R1-060481--.

IN THE SPECIFICATION

At column 1, line 23, after "system," delete "a" and insert therefore --an--.

At column 1, line 43, after "transmits" delete "a" and insert therefore --an--.

At column 2, line 3, after "of" delete "a" and insert therefore --an--.

Signed and Sealed this  
Eighth Day of March, 2016

Michelle K. Lee  
*Director of the United States Patent and Trademark Office*

UNITED STATES PATENT AND TRADEMARK OFFICE
CERTIFICATE OF CORRECTION

PATENT NO. : 8,400,986 B2  
APPLICATION NO. : 13/224463  
DATED : March 19, 2013  
INVENTOR(S) : Fatih M. Ozluturk Page 1 of 1

It is certified that error appears in the above-identified patent and that said Letters Patent is hereby corrected as shown below:

IN THE SPECIFICATION

At column 3, line 28, between "in" and "LB" delete "a" and insert therefor --an--.

At column 3, line 31, after "orthogonal" insert --to--.

At column 5, line 45, after "and" delete "use" and insert therefor --uses--.

IN THE CLAIMS

In claim 1, at column 6, line 43, after "a" delete "combines" and insert therefor --combined--.

In claim 1, at column 6, line 49, after "over" delete "a" and insert therefor --an--.

In claim 1, at column 6, line 51, after "the" delete "processinf" and insert therefor --processing--.

In claim 1, at column 6, line 54, after "received" delete "to the" and insert therefor --by--.

In claim 4, at column 7, line 3, after "(OFDM)" delete "multiple input multiple output" and insert therefor --multiple-input multiple-output--.

In claim 7, at column 7, line 21, after "received" delete "to" and insert therefor --by--.

In claim 10, at column 8, line 13, after "(OFDM)" delete "multiple input multiple output" and insert therefor --multiple-input multiple-output--.

Signed and Sealed this  
Third Day of May, 2016

Michelle K. Lee  
*Director of the United States Patent and Trademark Office*